United States Patent
Ramia et al.

(10) Patent No.: US 12,126,592 B2
(45) Date of Patent: Oct. 22, 2024

(54) NEUTRAL HOST EDGE SERVICES

(71) Applicant: Intel Corporation, Santa Clara, CA (US)

(72) Inventors: Kannan Babu Ramia, Bangalore (IN); Deepak S, Bangalore (IN); Palaniappan Ramanathan, Bengaluru (IN); Timothy Verrall, Pleasant Hill, CA (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 696 days.

(21) Appl. No.: 17/134,285

(22) Filed: Dec. 26, 2020

(65) Prior Publication Data

US 2021/0119962 A1    Apr. 22, 2021

(51) Int. Cl.
*H04L 61/4541*    (2022.01)
*G06F 9/455*    (2018.01)
(Continued)

(52) U.S. Cl.
CPC ...... *H04L 61/4541* (2022.05); *G06F 9/45558* (2013.01); *H04L 61/2567* (2013.01);
(Continued)

(58) Field of Classification Search
CPC ............. H04L 61/4541; H04L 61/2567; H04L 61/4511; H04L 65/1069; H04L 65/80; H04L 41/0895; H04L 41/5022; H04L 41/0806; H04L 41/40; H04L 41/5009; H04L 41/5019; H04L 41/5058; H04L 41/5054; H04L 47/762; H04L 61/2503; H04L 65/1016; H04L 65/1026;
(Continued)

(56) References Cited

U.S. PATENT DOCUMENTS 10,693,991 B1 *   6/2020   Jenkins ............... H04L 67/5682
2017/0187583 A1 * 6/2017   Beltt ................... H04L 41/5009
(Continued)

FOREIGN PATENT DOCUMENTS

| CN | 114679449 | 6/2022 |
| WO | 2020226979 | 11/2020 |
| WO | 2020231952 | 11/2020 |

OTHER PUBLICATIONS

Enhanced DNS Support TowardsDistributed MEC Enviornment, ETSI, Sep. 2020 (Year: 2020).*
(Continued)

*Primary Examiner* — Habte Mered
(74) *Attorney, Agent, or Firm* — Schwegman Lundberg & Woessner, P.A.

(57) ABSTRACT

Systems and methods may be used to provide neutral host edge services in an edge network. An example method may include generating a virtual machine for a communication service provider at a compute device. The method may include receiving a user packet originated at a user device associated with the communication service provider and identifying dynamic route information related to the user packet using the virtual machine corresponding to the communication service provider. Data may be output corresponding to the user packet based on the dynamic route information.

25 Claims, 14 Drawing Sheets

(51) Int. Cl.
*H04L 61/2567* (2022.01)
*H04L 61/4511* (2022.01)
*H04L 65/1069* (2022.01)
*H04L 65/80* (2022.01)
*H04W 4/50* (2018.01)

(52) U.S. Cl.
CPC ...... *H04L 61/4511* (2022.05); *H04L 65/1069* (2013.01); *H04L 65/80* (2013.01); *H04W 4/50* (2018.02); *G06F 2009/45562* (2013.01); *G06F 2009/4557* (2013.01)

(58) Field of Classification Search
CPC ..... H04L 65/612; H04L 67/289; H04L 67/10; H04L 67/1036; G06F 9/45558; G06F 2009/45562; G06F 2009/4557; G06F 2009/45595; H04W 4/50
See application file for complete search history.

(56) References Cited

U.S. PATENT DOCUMENTS

| | | | | |
|---|---|---|---|---|
| 2018/0331947 | A1* | 11/2018 | James | H04L 45/125 |
| 2022/0052961 | A1* | 2/2022 | Chauhan | H04L 47/82 |
| 2022/0159059 | A1* | 5/2022 | Abhigyan | H04L 67/51 |
| 2022/0182358 | A1* | 6/2022 | Xiong | H04L 61/2517 |
| 2023/0412563 | A1* | 12/2023 | Barnett | H04L 61/4511 |

OTHER PUBLICATIONS

"European Application Serial No. 21211172.8, Response filed Dec. 16, 2022 to Extended European Search Report mailed May 13, 2022", 9 pgs.

"3GPP; TSG SA; Study on enhancement of support for Edge Computing in 5G Core network (5GC) (Release 17)", 3GPP TR 23.748 V0.4.0,, (Aug. 3, 2020), 166 pgs.

"European Application Serial No. 21211172.8, Extended European Search Report mailed May 13, 2022", 14 pgs.

Suzuki, Masaki, "Enhanced DNS Support towards Distributed MEC Environment—ETSI White Paper No. 39", https:www.etsi.org images files ETSIWhitePapers etsi-wp39-Enhanced-DNS-Support-towards-Distributed-MEC-Environment.pdf, (Seo. 30, 2020), 1-25.

"European Application Serial No. 21211172.8, Communication Pursuant to Article 94(3) EPC mailed Sep. 5, 2024", 10 pgs.

* cited by examiner

NEUTRAL HOST EDGE SERVICES

BACKGROUND

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices. Furthermore, given their remote placement (e.g., remote from the core of a network), many of the compute devices that will perform the compute operations may obtain power from solar cells (photovoltaic cells), wind turbines, or other sources that may provide a smaller and less reliable supply of power than a connection to a power distribution grid. As such, the compute capacity at the remote compute locations may fluctuate with the availability of power, leading to an inability to guarantee a fixed level of performance (e.g., a target quality of service, such as a target latency, a target throughput, and/or other performance metrics that may be specified in a service level agreement between a user (client) of the compute resources and a provider of the compute resources).

Edge computing is a fast emerging paradigm in which data processing and delivery are situated closer to users such as in base stations, cell towers, central offices, etc. In its essence, the edge cloud for users is not just one location but is a cloud ecosystem consisting of multiple layers of computing environments at different locations. For example, computing resources would be available in both cell towers and central offices, with computing capabilities that may be similar in some respects and very different in others (e.g., max/average power, predictable power availability, amount of reserve power, and, correspondingly, the amounts of resource bandwidths and utilizations that can be supported).

An example workload in edge cloud is Content Delivery Network (CDN) services, using edge cloud facilities to serve ever growing content volumes to an ever growing base of subscribers. Other typical workloads in edge cloud infrastructures include Mobile-edge or Multi-access edge computing (MEC) in which services and applications that may typically run in traditional clouds are offered also to mobile customers at low and predictable response times (for many usages including for real-time communications-based interactive purposes), and where the consumption and often even the service end-points are non-stationary.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods described herein may be used for hosting edge services at a neutral edge device host. The edge device host may be neutral in the sense that the edge device hosts or provides services for more than one communication service provider (CoSP). The edge device may not treat incoming data agnostically, but instead may be configured to provide services to each of the more than one CoSP separately. For example, a set of virtual machines may be configured on the neutral edge device, with each virtual machine of the set of virtual machines used for implementing services, such as routing data, for a corresponding CoSP.

In an example, the neutral edge device may be used to host services for more than one content provider. The content providers may be separate from the CoSPs, or integrated (in a one to one or a one to many manner) with the CoSPs.

The systems and methods described herein provide wireless access networks, including tower sites (e.g., edge nodes), with neutral managed services, for example for cellular operators to minimize infrastructure cost and maintenance. The optimization benefits are achieved by sharing with multiple other operators. The systems and methods described herein maintain these neutral edge devices without compromising the security, confidentiality, and functionality required and expected by the network operators. The neutral edge devices may be used as physical infrastructure providers without network or content branding (e.g., neutral to network or content, but not necessarily agnostic to network or content). The systems and methods described herein enable the edge devices to provide physical infrastructure to latency sensitive edge application providers with neutral edge services, while maintaining the required security, confidentiality, and functionality.

Figure 1:
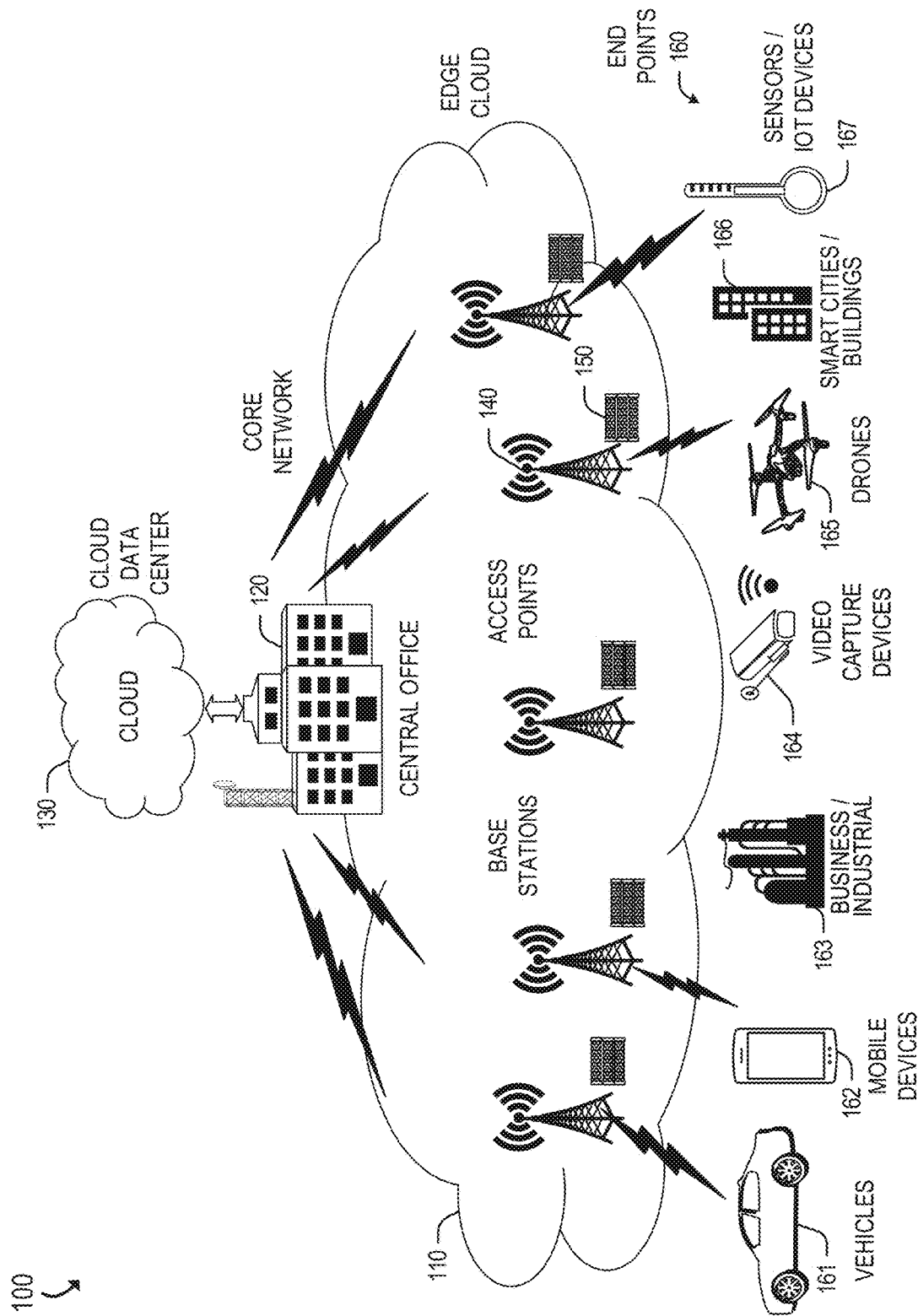
FIG. 1 illustrates an overview of an edge cloud configuration for edge computing in accordance with some examples.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
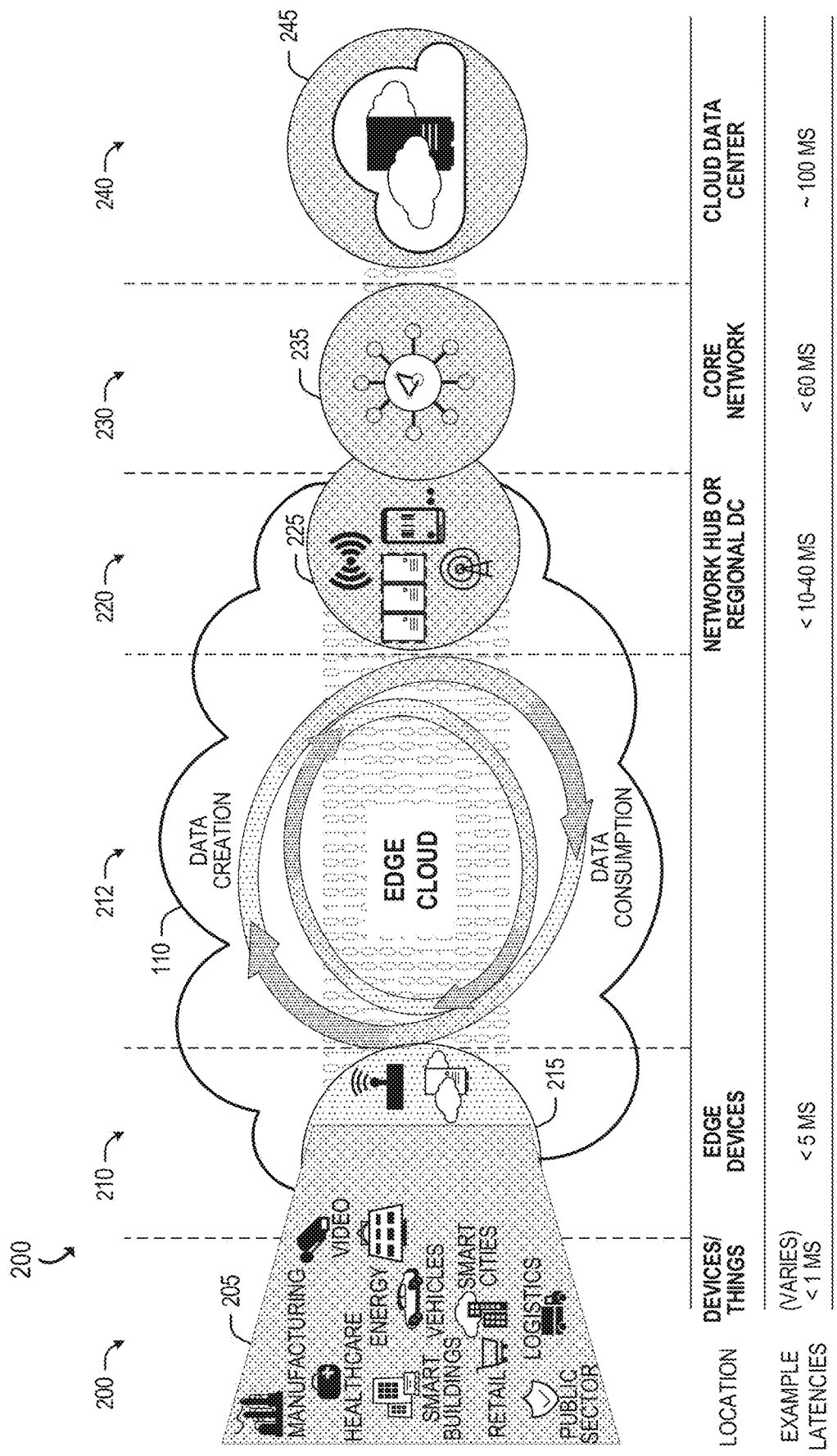
FIG. 2 illustrates operational layers among endpoints, an edge cloud, and cloud computing environments in accordance with some examples.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8B. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
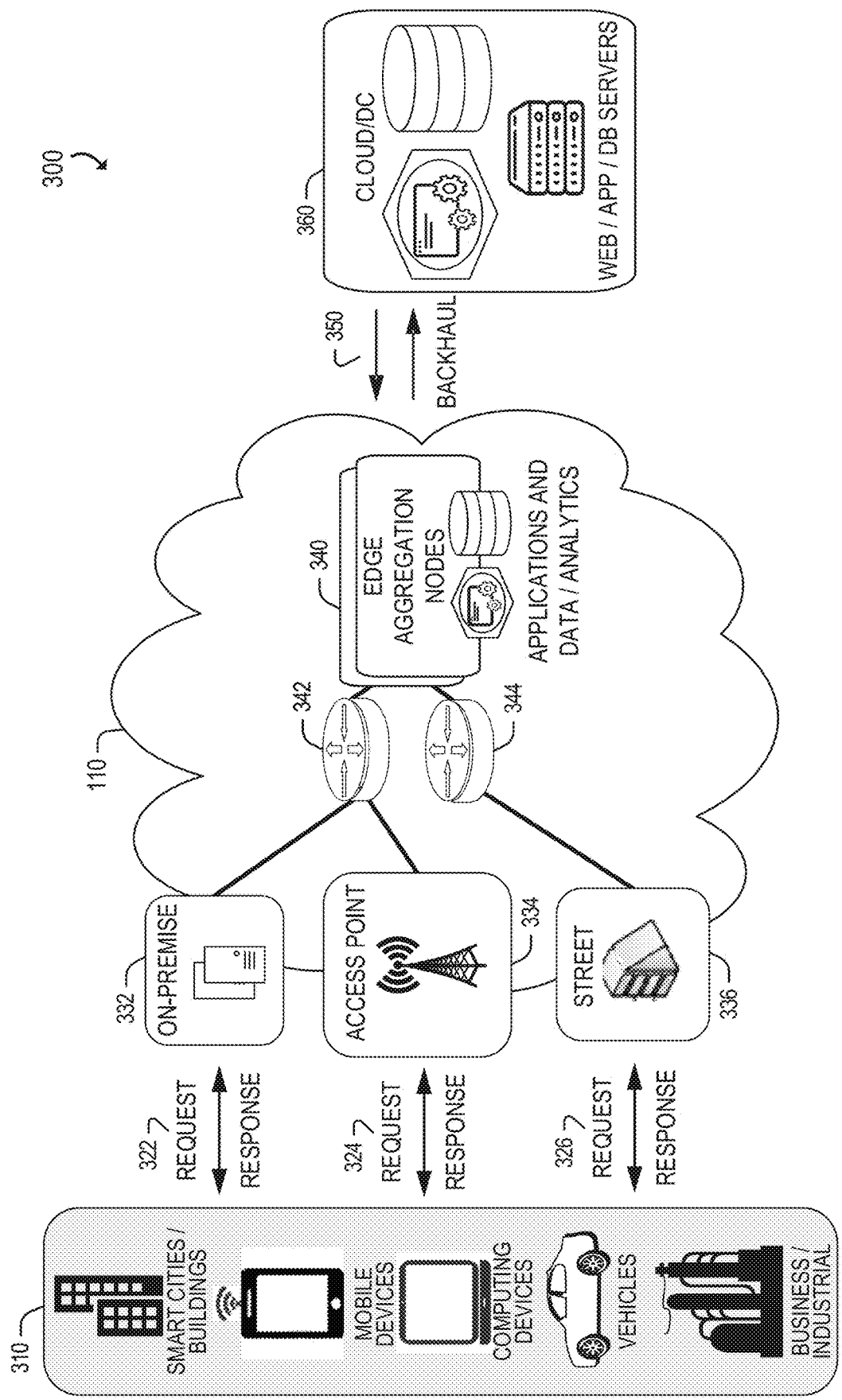
FIG. 3 illustrates an example approach for networking and services in an edge computing system in accordance with some examples.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
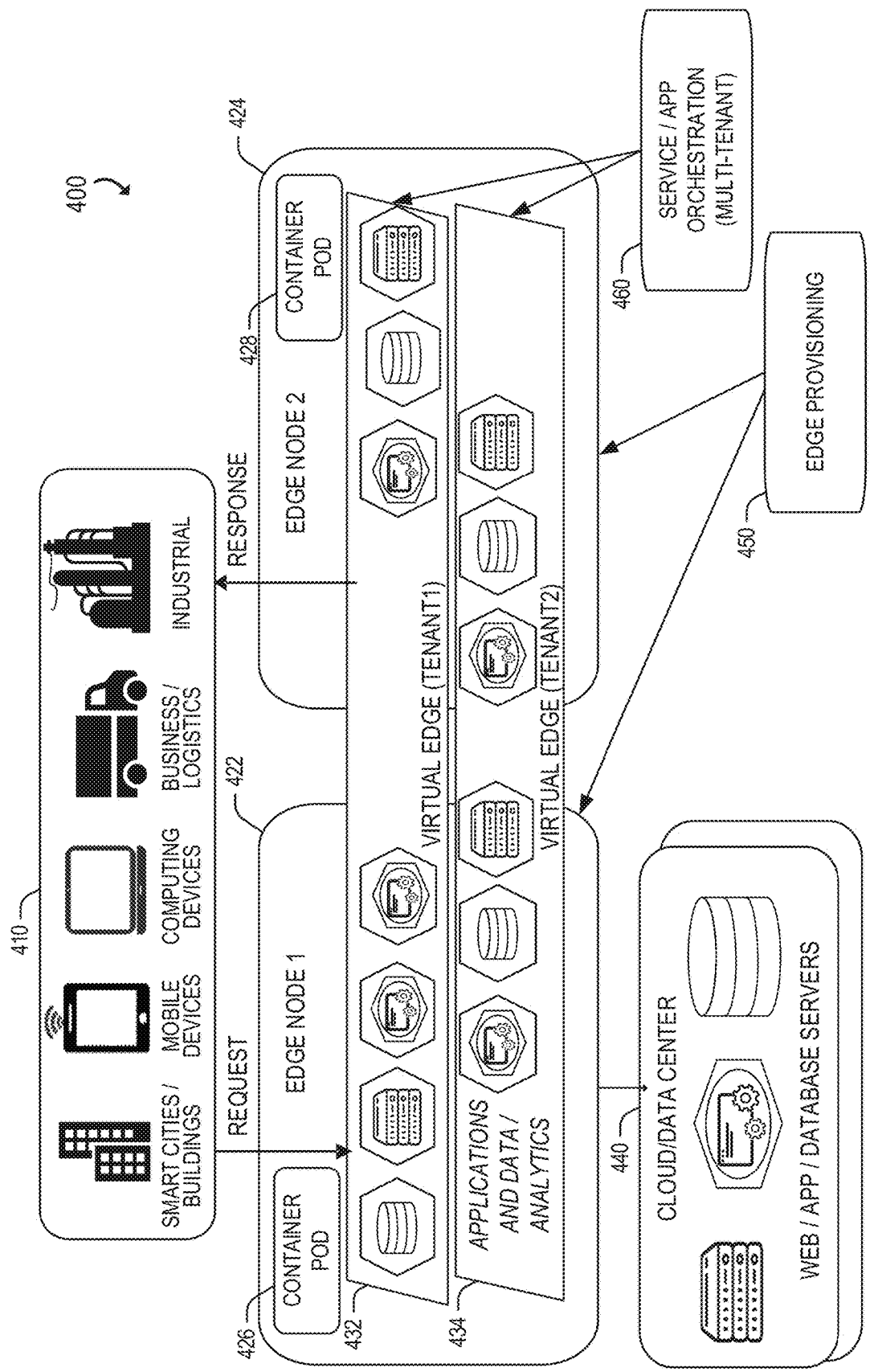
FIG. 4 illustrates deployment of a virtual edge configuration in an edge computing system operated among multiple edge nodes and multiple tenants in accordance with some examples.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
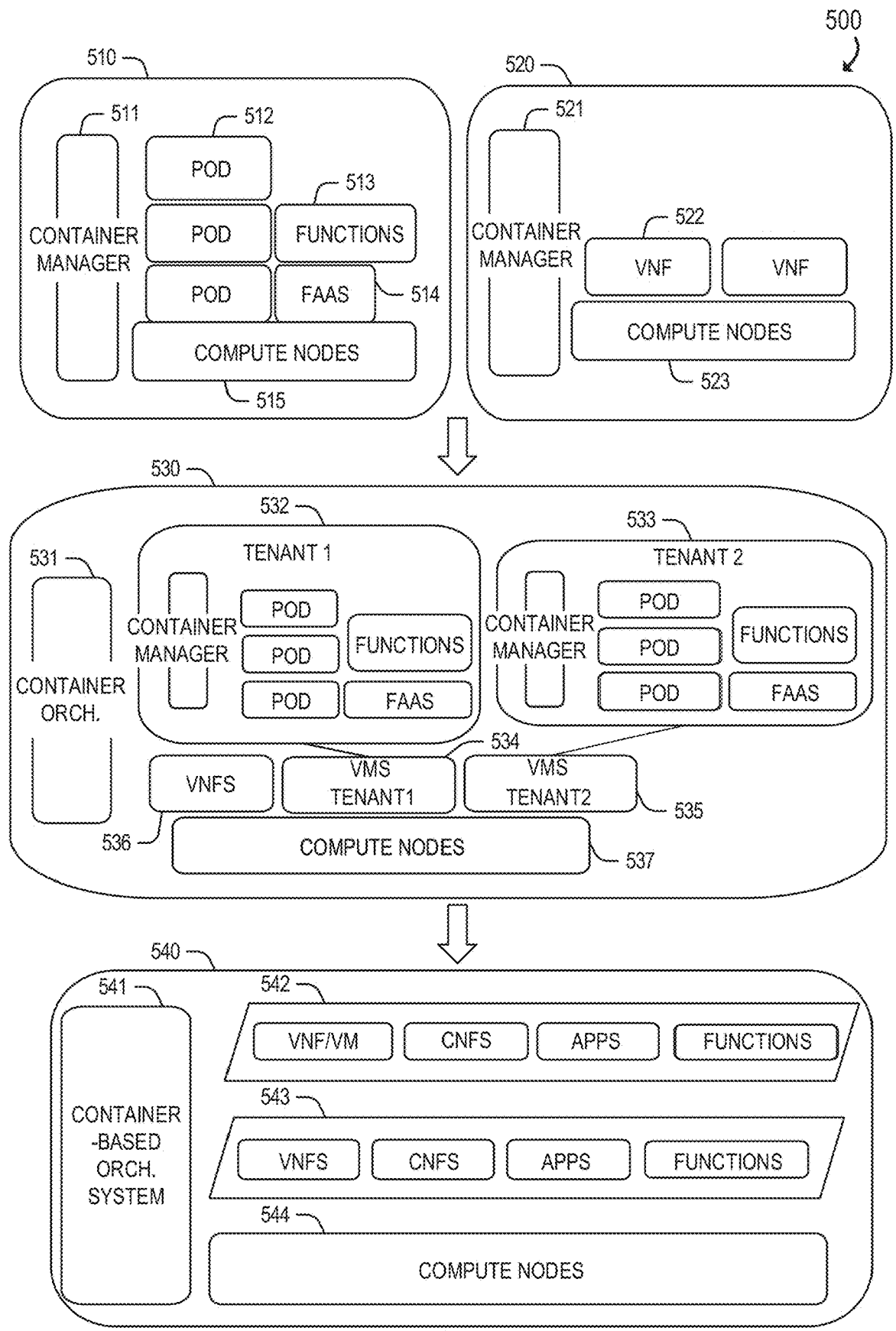
FIG. 5 illustrates various compute arrangements deploying containers in an edge computing system in accordance with some examples.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
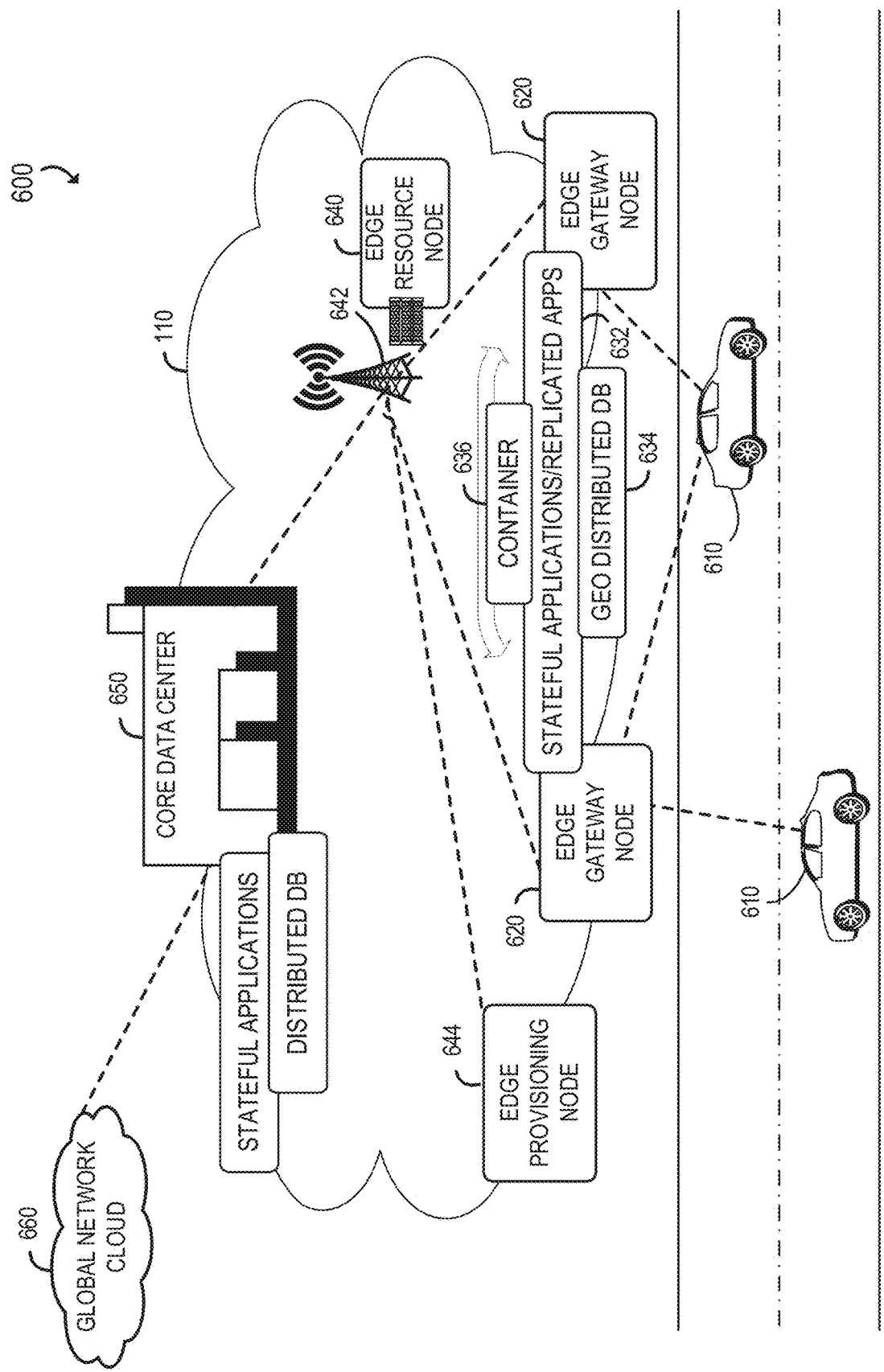
FIG. 6 illustrates a compute and communication use case involving mobile access to applications in an edge computing system in accordance with some examples.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces: coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8B, may be downloaded to the example processor platform/s, which is to execute the computer readable instructions 882 to implement the methods described herein.

In some examples, the processor platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8B) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
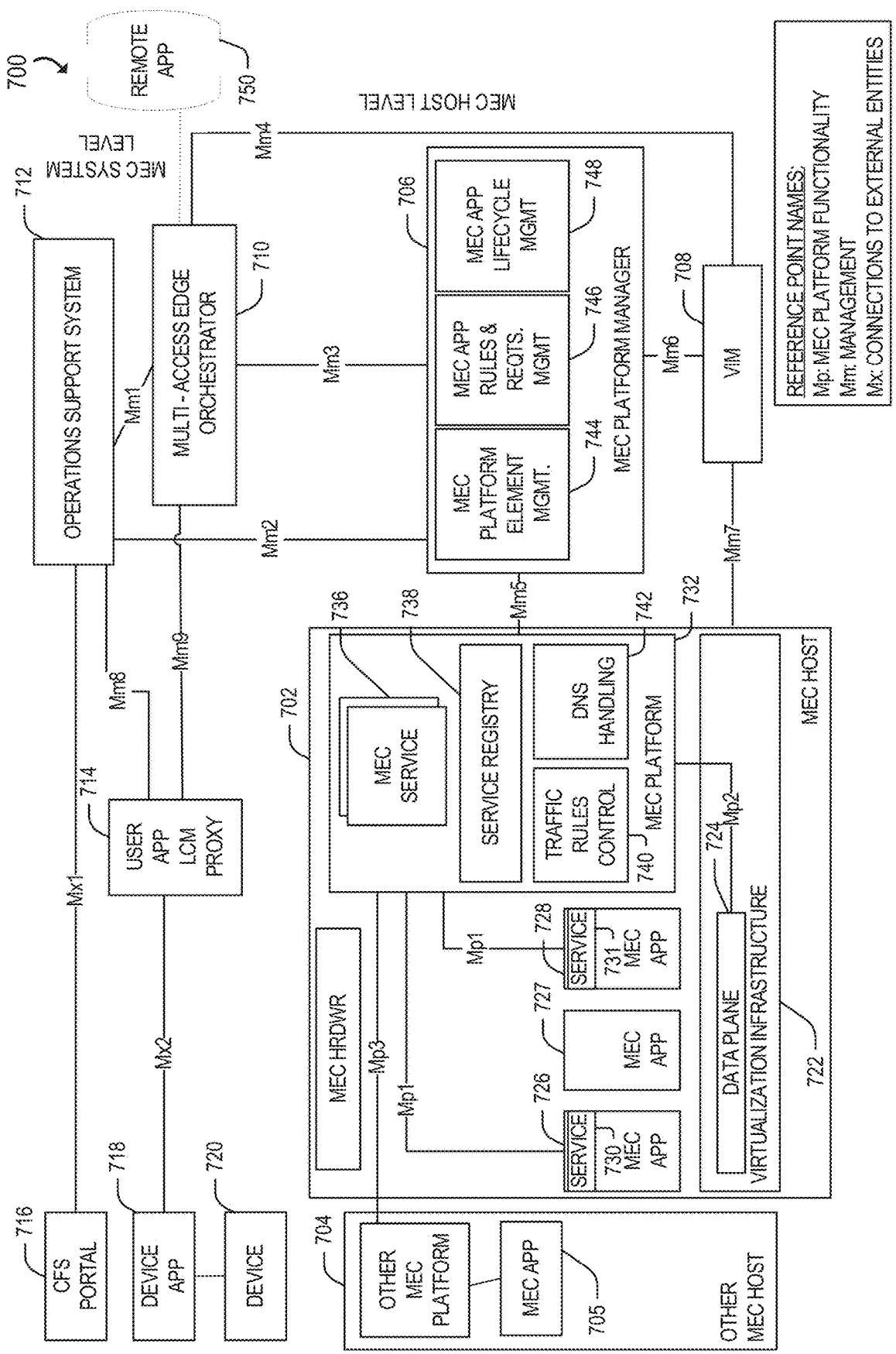
FIG. 7 illustrates an example mobile edge system reference architecture, arranged according to an ETSI Multi-Access Edge Computing (MEC) specification in accordance with some examples.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700, such as managing virtual machines on an edge node.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN or telecom-core network entities). The MEC app 705 instantiated within MEC host 704 can be similar to the MEC apps 726-728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744. MEC app rules and requirements management component 746, and MEC app lifecycle management component 748. The various entities within the MEC architecture 700 can perform functionalities as disclosed by the ETSI GS MEC-003 specification.

In some aspects, the remote application (or app) 750 is configured to communicate with the MEC host 702 (e.g., with the MEC apps 726-728) via the MEC orchestrator 710 and the MEC platform manager 706.

In further examples, any of the compute nodes or devices discussed with reference to the present edge computing systems and environment may be fulfilled based on the components depicted in FIGS. 8A and 8B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8A:
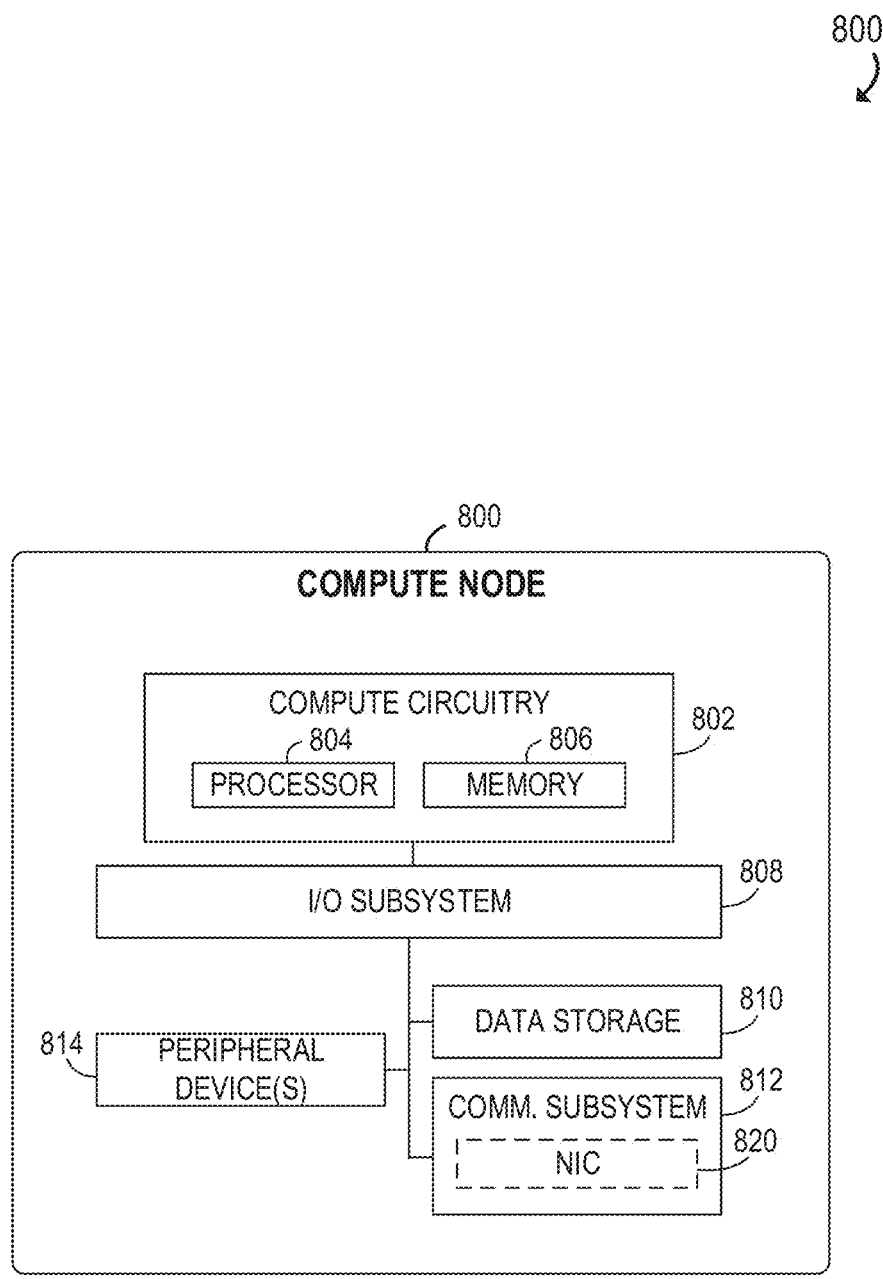
FIG. 8A provides an overview of example components for compute deployed at a compute node in an edge computing system in accordance with some examples.

In the simplified example depicted in FIG. 8A, an edge compute node 800 includes a compute engine (also referred to herein as "compute circuitry") 802, an input/output (I/O) subsystem 808, data storage 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or other processor or processing/controlling circuit.

In some examples, the processor 804 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 and/or the main memory 806) and other components of the compute circuitry 802. For example, the I/O subsystem 808 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

The one or more illustrative data storage devices 810 may be embodied as any type of devices configured for short-term or long-term storage of data such as, for example, memory devices and circuits, memory cards, hard disk drives, solid-state drives, or other data storage devices. Individual data storage devices 810 may include a system partition that stores data and firmware code for the data storage device 810. Individual data storage devices 810 may also include one or more operating system partitions that store data files and executables for operating systems depending on, for example, the type of compute node 800.

The communication circuitry 812 may be embodied as any communication circuit, device, or collection thereof, capable of enabling communications over a network between the compute circuitry 802 and another compute device (e.g., an edge gateway of an implementing edge computing system). The communication circuitry 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., an edge gateway node). In some examples, the NIC 820 may be embodied as part of a system-on-a-chip (SoC) that includes one or more processors, or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or alternatively, in such examples, the local memory of the NIC 820 may be integrated into one or more components of the client compute node at the board level, socket level, chip level, and/or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective edge compute node (whether a client, gateway, or aggregation node) in an edge computing system or like forms of appliances, computers, subsystems, circuitry, or other components.

Figure 8B:
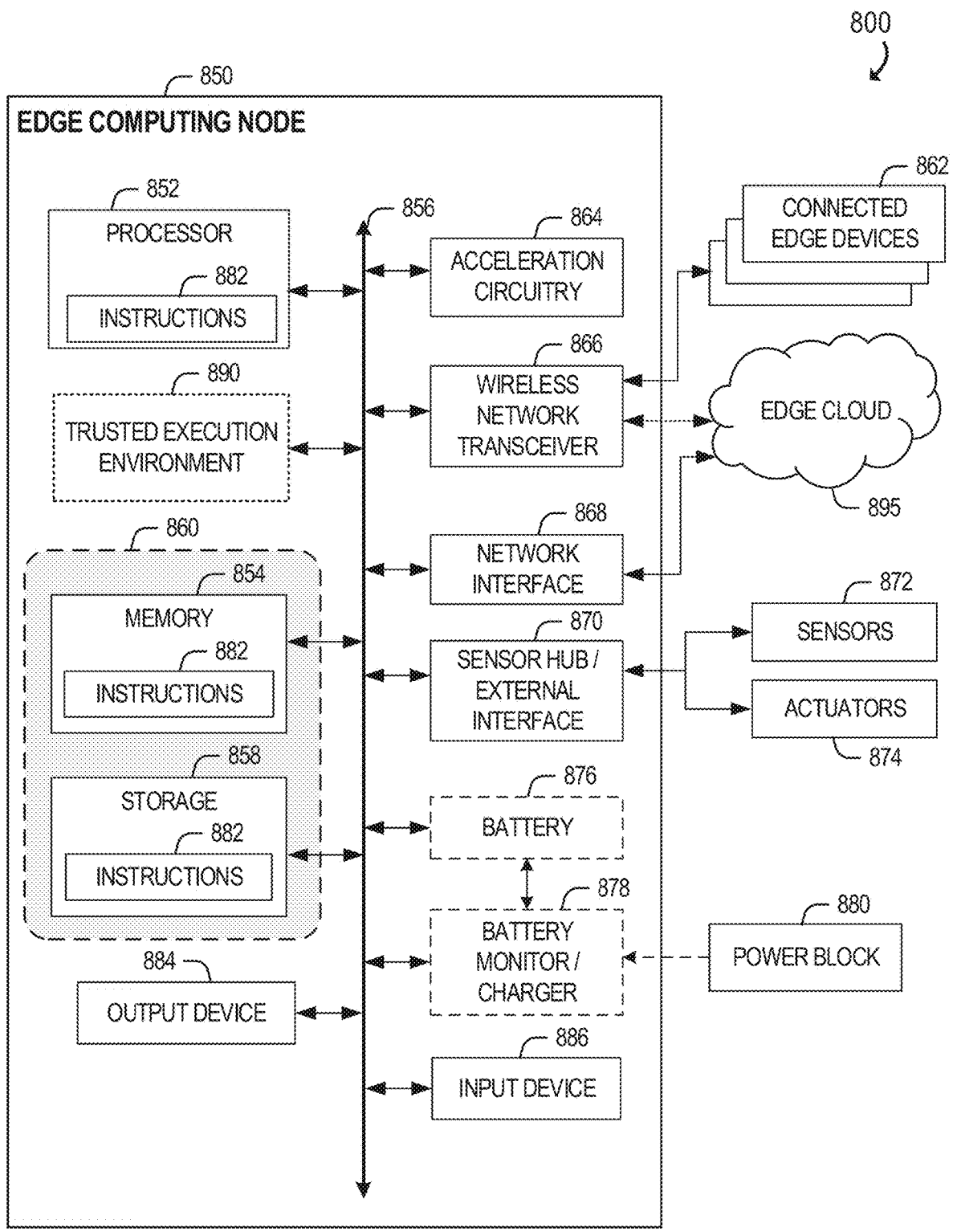
FIG. 8B provides a further overview of example components within a computing device in an edge computing system in accordance with some examples.

In a more detailed example, FIG. 8B illustrates a block diagram of an example of components that may be present in an edge computing node 850 for implementing the techniques (e.g., operations, processes, methods, and methodologies) described herein. This edge computing node 850 provides a closer view of the respective components of node 800 when implemented as or as part of a computing device (e.g., as a mobile device, a base station, server, gateway, etc.). The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As examples, the memory 854 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862. e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWANn (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN). Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs. or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

Figure 8C:
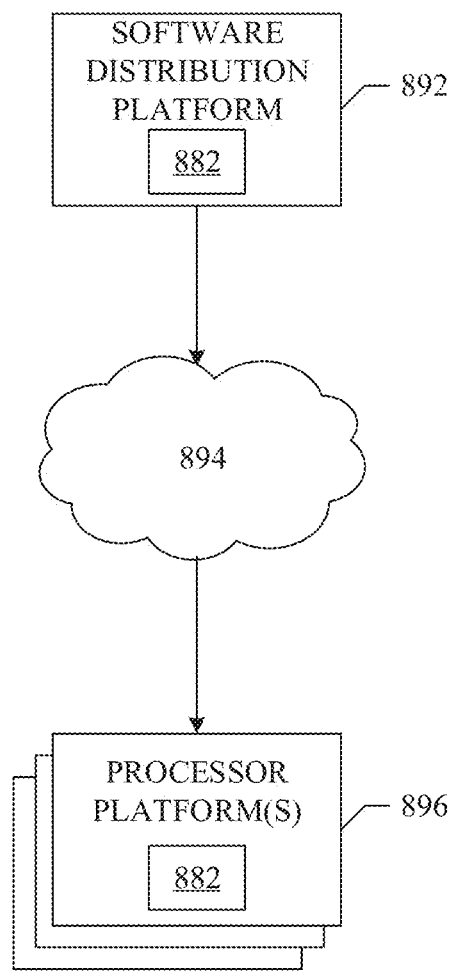
FIG. 8C illustrates an example software distribution platform to distribute software in accordance with some embodiments.

FIG. 8C illustrates an example software distribution platform 892 to distribute software, such as the example computer readable instructions 882 of FIG. 8B, to one or more devices, such as example processor platform(s) 896 or example connected edge devices. The example software distribution platform 892 may be implemented by any computer server, data facility, cloud service, etc., capable of storing and transmitting software to other computing devices (e.g., third parties, the example connected edge devices disclosed herein). Example connected edge devices may be customers, clients, managing devices (e.g., servers), third parties (e.g., customers of an entity owning and/or operating the software distribution platform 896). Example connected edge devices may operate in commercial and/or home automation environments. In some examples, a third party is a developer, a seller, and/or a licensor of software such as the example computer readable instructions 882 of FIG. 8B. The third parties may be consumers, users, retailers. OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 8C, the software distribution platform 892 includes one or more servers and one or more storage devices. The storage devices store the computer readable instructions 882, which may correspond to example computer readable instructions, as described above. The one or more servers of the example software distribution platform 892 are in communication with a network 894, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 892. For example, the software, which may correspond to the example computer readable instructions, may be downloaded to the example processor platform(s) 896 (e.g., example connected edge devices), which is/are to execute the computer readable instructions 882 to implement the techniques described herein. In some examples, one or more servers of the software distribution platform 892 are communicatively connected to one or more security domains and/or security devices through which requests and transmissions of the example computer readable instructions 882 must pass. In some examples, one or more servers of the software distribution platform 892 periodically offer, transmit, and/or force updates to the software (e.g., the example computer readable instructions 882 of FIG. 8B) to ensure improvements, patches, updates, etc. are distributed and applied to the software at the end user devices.

In the illustrated example of FIG. 8C, the computer readable instructions 882 are stored on storage devices of the software distribution platform 892 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 892 are in a first format when transmitted to the example processor platform(s) 896. In some examples, the first format is an executable binary in which particular types of the processor platform(s) 896 can execute. However, in some examples, the first format is uncompiled code that requires one or more preparation tasks to transform the first format to a second format to enable execution on the example processor platform(s) 896. For instance, the receiving processor platform(s) 896 may need to compile the computer readable instructions 882 in the first format to generate executable code in a second format that is capable of being executed on the processor platform(s) 896. In still other examples, the first format is interpreted code that, upon reaching the processor platform(s) 896, is interpreted by an interpreter to facilitate execution of instructions.

Figure 9:
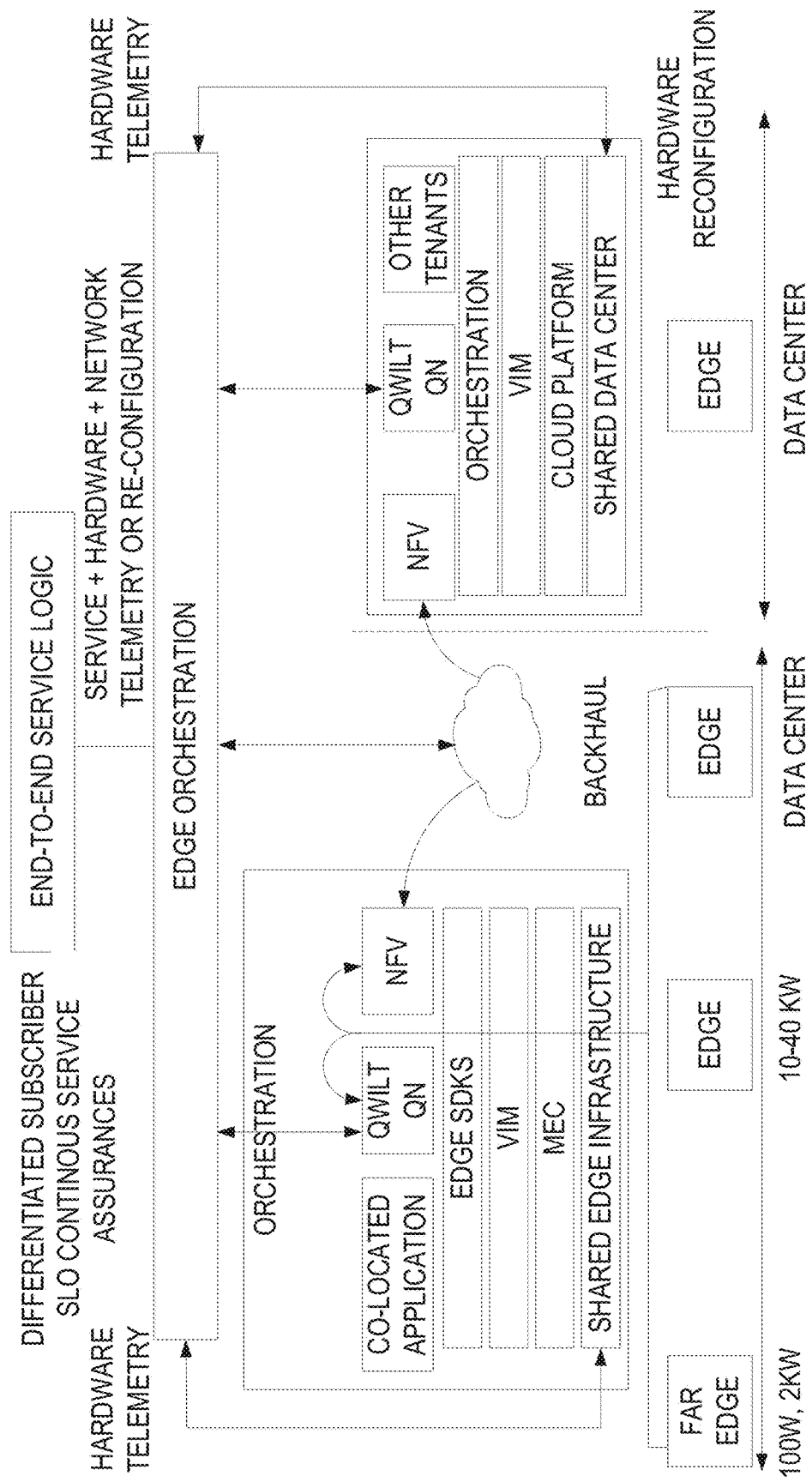
FIG. 9 illustrating an edge architecture running multiple tiers, multiple services, and multiple stacks in accordance with some examples.

FIG. 9 illustrating an edge architecture 900 running multiple tiers, multiple services, and multiple stacks in accordance with some examples. The edge architecture 900 includes specific implementation examples for illustrative purposes, but which are not necessary to the systems and methods described herein.

The edge architecture 900 includes a neutral platform with the capacity to serve multiple cellular operators and their customers simultaneously. Neutrality of the edge architecture 900 does not mean that each packet is treated equally, but that more than one operator may be serviced by the same edge component, device, or network. The edge architecture 900 may further provide dynamicity with loads and service level agreements that vary across the cycle of life of the edge. The services and users accessing those services may move over time (e.g., to another edge device or network). The edge architecture 900 may include infrastructure sharing (e.g., sharing edge deployments by multiple edge entities). The edge architecture 900 may provide virtual machines for each edge entity, allowing edge sharing and flexibility of deployment of resources. The edge architecture 900 may include multi-access edge computing (MEC) infrastructure (see above), such as Open Network Edge Services Software (OpenNESS) framework (e.g., as described at https://www.openness.org/), in some examples.

A compute device in the edge architecture 900 may use a set of operating parameters to provide the neutral service to multiple edge entities. For example, parameters adjustments may include modifying an edge system that is only reachable through globally routable internet protocol (IP) space when serving clients from multiple providers. This edge system may use a public IP address and may be modified to include a private network space, in some examples. The edge system of the edge architecture 900 may host network functions in a neutral manner by modifying these parameters, in an example.

The edge architecture 900 may turn a typical edge device deployment into a neutral host, for example at a tower site. The edge architecture 900 includes an ability to provide software infrastructure as a service for hosting third party network functions. This enables limited changes in a CoSP network to accommodate the neutral edge architecture 900.

The edge architecture 900 may include a modular edge platform capable of dynamic traffic steering, service discovery, and DNS updates. This capability enables the end services to be provided from a local edge system transparent of a CoSP core. For example, the edge architecture 900 may be deployed in multiple instances on a compute device (e.g., one per operator). The compute device may use traffic steering between each of the instances of the edge architecture 900 or load balancing of traffic between each of the instances of the edge architecture 900 based on dynamic and smart contracts.

The edge architecture 900 includes new interfaces to the services stack to allow influence decisions on how traffic and quality of service is managed. This includes an edge DNS that may update authoritative DNS records from trusted applications. The edge DNS may dynamically route user equipment (UE) traffic directly in the compute device. The edge DNS may be a specific DNS deployed to a respective compute device or set of compute devices of the edge architecture 900 (e.g., each compute device may have its own edge DNS for internal routing).

The edge architecture 900 include a virtual infrastructure to CoSPs (communication service providers) for onboarding their network functions (e.g., user plane function (UPF) for 5G & system architecture evolution gateway (SAE-GW) for 4G). The virtual infrastructure may provide for the CoSPs to configure physical connectivity directly to their own cell site routers. The virtual infrastructure may be hosted in the edge platform.

In an example, a third party application may be onboarded into the edge platform and update the DNS record into edge DNS via a discoverable service API. The combination of CoSP network function and with the edge architecture 900 provides application services from the edge system to the end CoSP customer.

The edge architecture 900 may maintain a virtual machine for a CoSP. The CoSP may host network functions at the virtual machine, which may be operated in a manner opaque to other CoSPs. The network functions may maintain subscriber identity on the virtual machine. In an example, a CoSP may use the edge architecture 900 as a software infrastructure as a service, with the CoSP hosting software in the edge node. In this manner, base stations or cell sites do not need to be modified to communicate with an edge server deploying the edge architecture 900.

Dynamic traffic steering at the edge architecture 900 may direct traffic to a local edge server for higher quality of service, such as for quicker service, a dedicated service, a closer service, a lower latency service, or the like. The DNS record for data to be accessed may change according to the CoSP, and may be unique to the CoSP. For example, a content provider may store data on the edge server and have a DNS record that is modified or updated dynamically for a particular CoSP or a particular customer of a CoSP, or both. The content provider DNS may be moved to an edge server in the neutral edge network that is local or closer to the end user. In an example, the services provided at an edge server deploying the edge architecture 900 for CoSPs may include a service-based cost or charge for the CoSP or the end-user based on available offerings, such as available speed, latency, bandwidth, etc.

Figure 10:
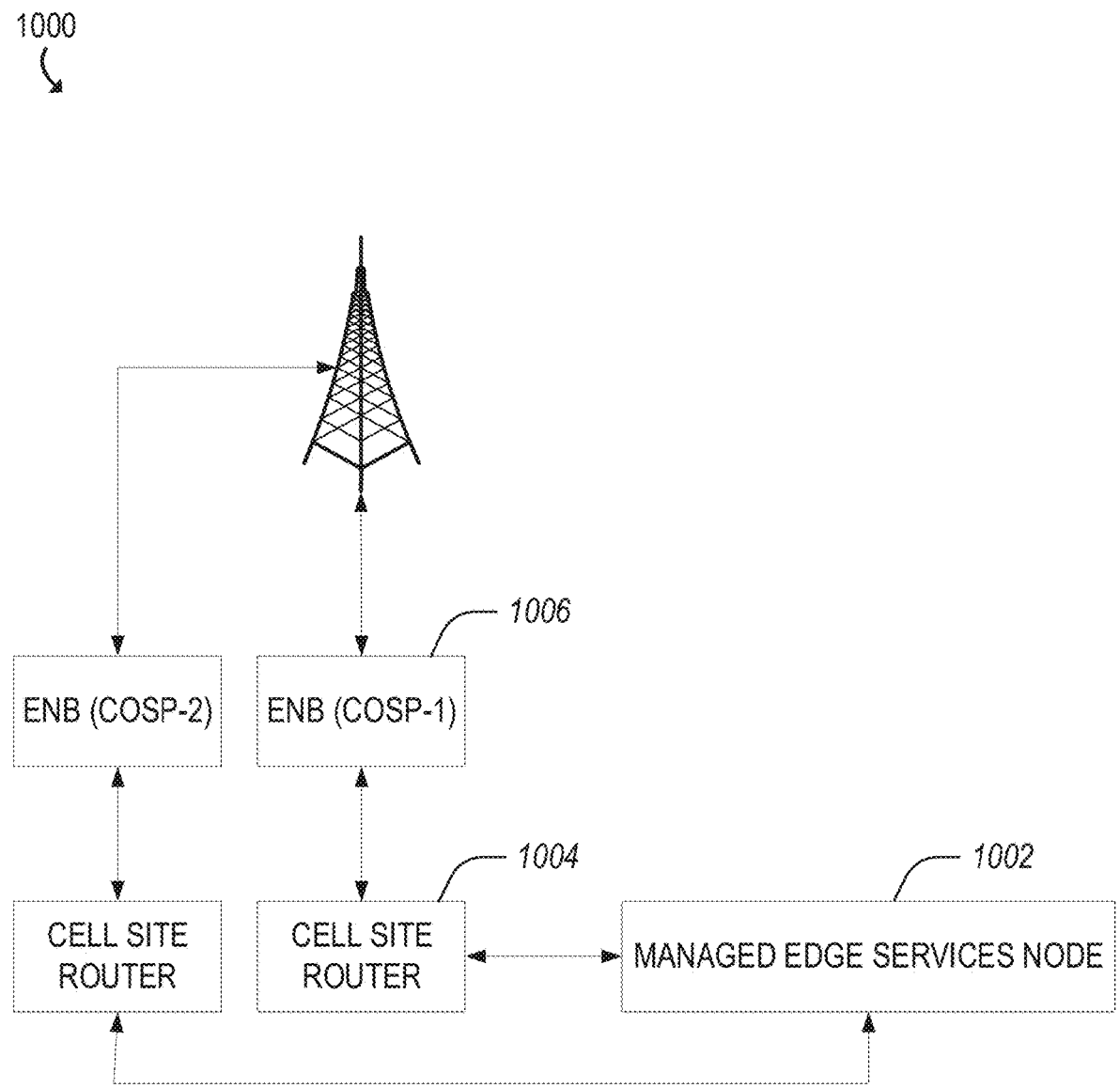
FIGS. 10-11 illustrating example Managed Neutral Edge (MNE) deployments in accordance with some examples.

FIG. 10 illustrates an example Managed Neutral Edge (MNE) deployment 1000 in accordance with some examples. The MNE deployment 1000 includes a MNE node 1002, router, eNBs, and a cell tower, by way of example. The MNE node 1002 may deploy a virtual machine corresponding to each CoSP serviced.

The MNE deployment 1000 is an example arrangement, simplified to show two CoSPs, but more or fewer may be available at the MNE node 1002 or other nodes of the MNE deployment 1000. The MNE node 1002 may receive traffic, for example sent by a UE to the cell tower, via an eNB 1006 corresponding to a CoSP. The traffic may be routed at the MNE node 1002 based on the CoSP from which the traffic is received. The CoSP traffic may be transparently serviced by the MNE node 1002, for example without a change to the eNB 1006 or the router of the CoSP. A CoSP management system may retain control over its user traffic, forwarding only the traffic it routes to the MNE node 1002 to reach the MNE node 1002. In an example, the CoSP may provide support for user selection of edge services. In this example, the CoSP may choose to send the traffic to the MNE deployment 1000, which may route the traffic to the MNE node 1002, or the CoSP may have the traffic sent directly (e.g., from a router 1004) to the MNE node 1002. Each CoSP may use its own configurations for communicating and arranging traffic with the MNE deployment 1000.

The MNE node 1002 may transparently provide services to the end users of different CoSP simultaneously with option of providing differentiated QoS. For example, traffic may be differentiated for QoS corresponding to a CoSP, a user, a content requested, or the like. The QoS may be identified by the CoSP or the MNE node 1002 when dynamically routing traffic.

Figure 11:
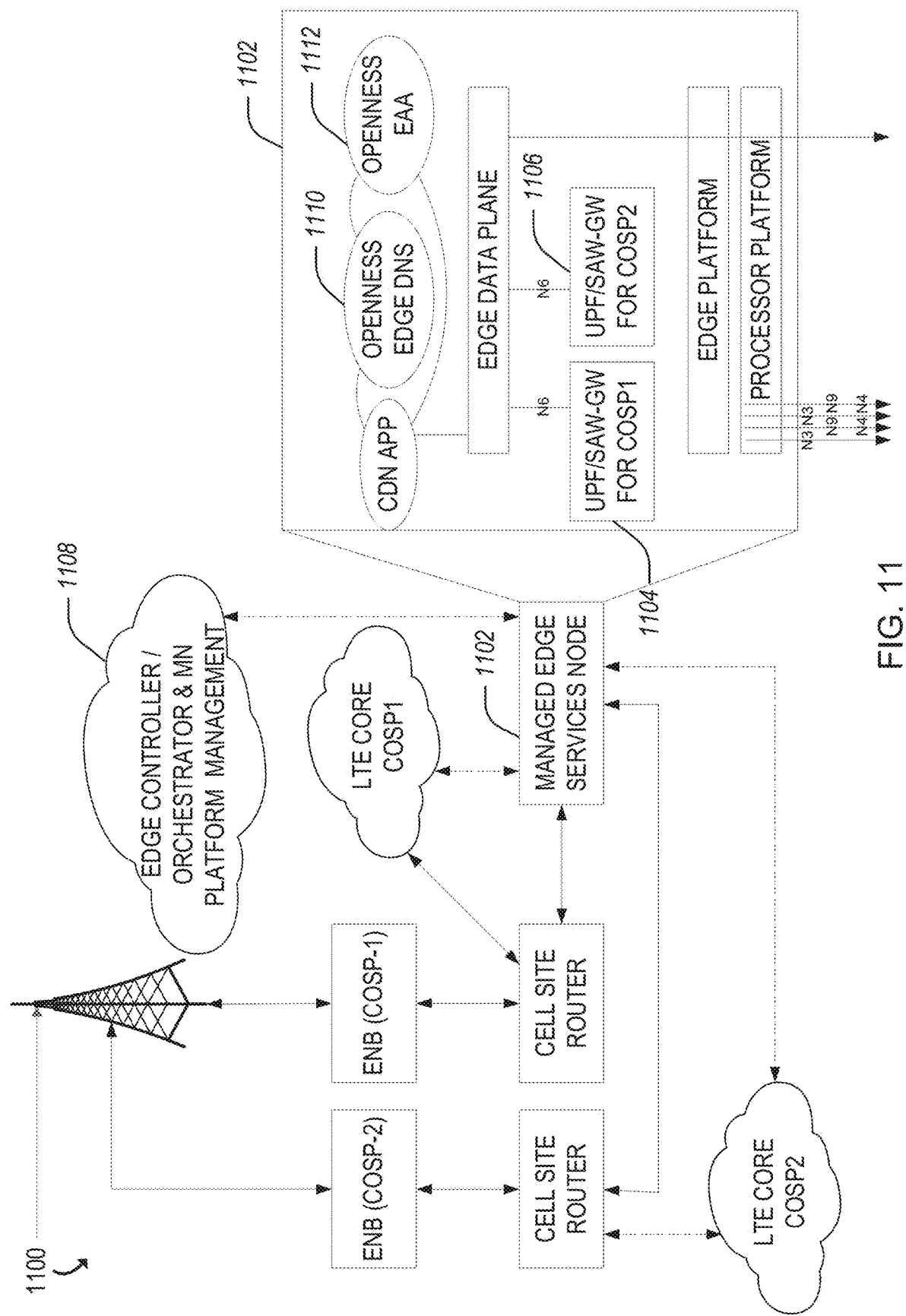

FIG. 11 illustrates an example Managed Neutral Edge (MNE) deployment 1100 in accordance with some examples. In some examples, the MNE deployment 1100 is the same as or shares components with the MNE deployment 1000. In other examples, the MNE deployments 1100 and 1000 are entirely separate configurations. Features described for one of the MNE deployments 1000 or 1100 may be used with the other.

The MNE deployment 1100 includes an edge server 1102. The edge server 1102 may include one or more CoSP-specific configurations, such as virtual machines. The edge server 1102 of FIG. 11 includes two virtual machines 1104 and 1106, as an example, but more or fewer may be used in various examples.

The virtual machine 1104 includes a UPF or SAE-GW for a first CoSP (e.g., depending on whether the first CoSP is for a 5G or 4G configuration). Similarly, virtual machine 1006 includes a UPF or SAE-GW for a second CoSP (e.g., depending on whether the second CoSP is for a 5G or 4G configuration).

The MNE deployment 1100 includes components for the CoSPs to host their network functions in the edge system through a multi-cluster orchestrator 1108 at a central location. Each CoSP may host a UPF with N6 and N9 interfaces at the edge server 1102, while connecting to a central control plane corresponding to the respective CoSP through an N4 interface. The N6 interface may be configured for the neutral edge provider network at the MNE deployment 1100.

The edge server 1102 may be setup by the central orchestrator. The edge server 1102 include an edge software stack (e.g., OpenNESS), which may onboard third party applications (e.g., content delivery network applications). In an example, the third-party applications may be onboarded in their own virtual machines or in a container (e.g., Docker container). In another example, a content delivery network application may be onboarded in a virtual machine specific to a CoSP, for example within the virtual machine 1104 or 1106 or in a separate virtual machine. In an example, a content delivery network application may be onboarded into two or more virtual machines, for example one corresponding to the first CoSP and one corresponding to the second CoSP. The arrangement of virtual machines may facilitate QoS or network requirements, such as security, while maintaining neutrality at the edge server 1102.

A URL of an application (e.g., a content application, alone or with a CoSP) may be registered edge DNS service 1110 (e.g., an OpenNESS edge DNS), such as via an Edge Application Agent (EAA) service discovery API 1112. The edge DNS service 1110 may include a microservice that only accepts a DNS record from local trusted applications via the EAA service API 1112. In an example, the orchestrator 1108 or one of the CoSPs or content delivery networks may provide a DNS record. The edge DNS service 1110 may be run in a virtual machine or in a container, in an example.

In an example, an OpenNESS application function (AF) microservice may be used to configure a respective UPF or SAE-GW to re-direct DNS traffic of a selected user to the local edge DNS 1110. Any DNS queries from the selected user may be handled by the edge DNS 1110. For example, when the record is found, a response may be sent (e.g., to the eNB corresponding to a CoSP of the UE that sent the request). When the record is not found, the DNS query may be forwarded to a central recursive DNS server of the respective CoSP for the response.

The N6 interface may provide a differentiation of user traffic from multiple CoSP operators. For example, a UE may have more than one corresponding CoSP for traffic. The N6 may indicate which CoSP is appropriate for a particular packet of network traffic. In an example, the UE may have differentiated service for content, independent of CoSP. A source network address translation (NAT) for an N6 interface of one of the CoSPs at an edge data plane may differentiate the CoSPs user traffic, for example even when the UE address overlaps between two operators. In some examples, a CoSP may have different UEs with differentiated service for a specific content provider. For example, a first UE may have prioritized access to the content, where a second UE does not. The prioritized access may include quicker service, dedicated service, lower latency, closer compute device, higher bitrate or bandwidth (e.g., 4K video vs. HD vs. low definition video), or the like. In an example, the edge server 1102 may be deployed in a stadium or other high-density location (e.g., an airport, a state fair, etc.) to provide services, such as video, augmented reality, virtual reality, or the like.

Figure 12:
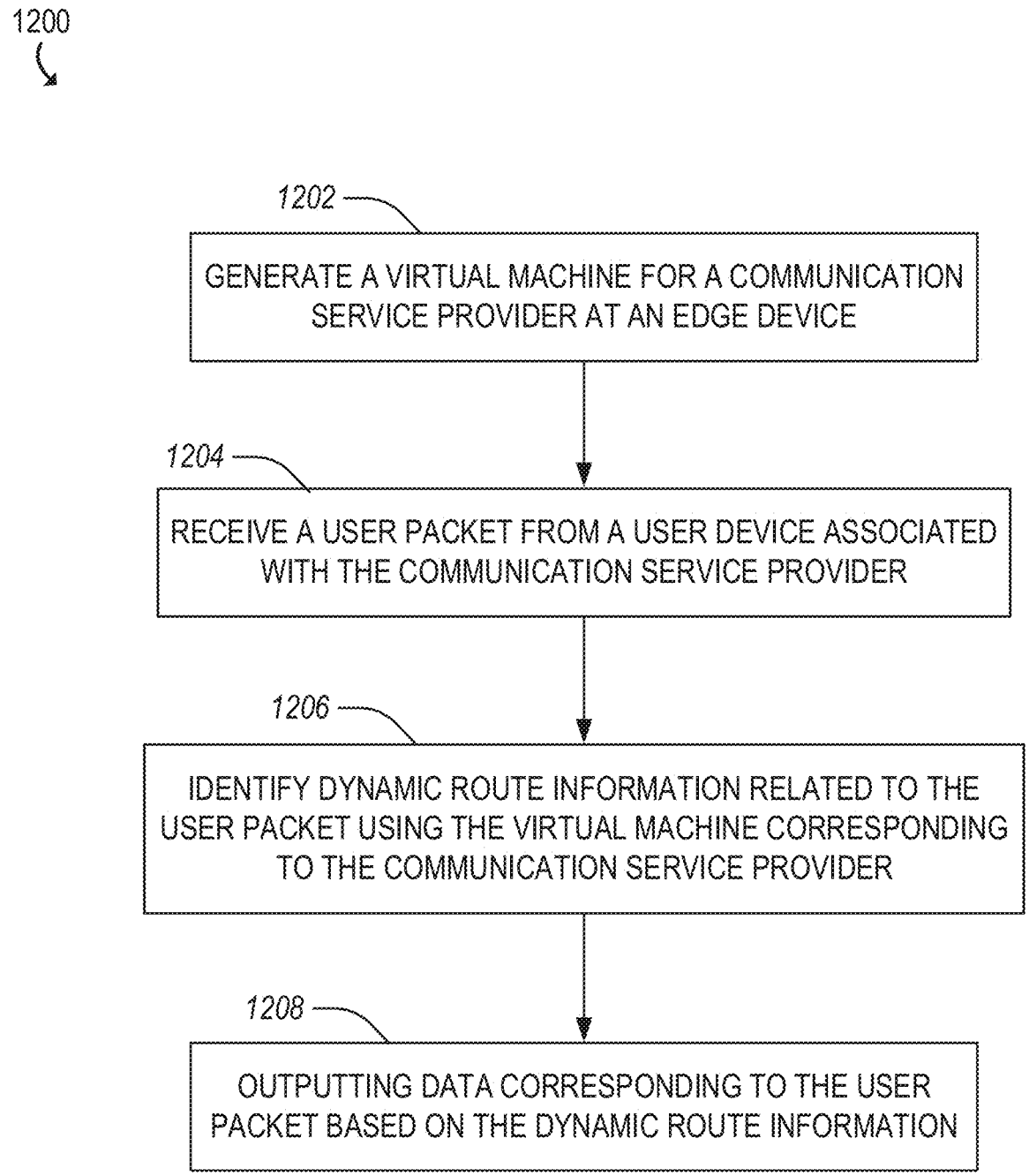
FIG. 12 illustrates a flowchart showing a technique for providing neutral host edge services in an edge network in accordance with some examples.

FIG. 12 illustrates a flowchart showing a technique 1200 for providing neutral host edge services in an edge network in accordance with some embodiments. The edge network may include a compute device (e.g., an edge node of the edge network) to perform the technique 1200.

The technique 1200 includes an operation 1202 to generate a virtual machine for a communication service provider at a compute device. The virtual machine may be configured to host network functions for the communication service provider. The virtual machine may be one of a plurality of virtual machines for a corresponding plurality of communication service providers at the compute device. The technique 1200 includes an operation 1204 to receive a user packet originated at a user device associated with the communication service provider.

The technique 1200 includes an operation 1208 to identify dynamic route information related to the user packet using the virtual machine corresponding to the communication service provider. The dynamic route information may is based on a user selection of edge services, such as content, a website, stored data, or the like. For example, the user may request content, and based on the communication service provider for the user, be routed to the content according to the dynamic route information. In some examples, the content may be accessed in a manner agnostic to the communications service provider, while in another example, the content may be accessed according to parameters specific to the communication service provider. This second example may include a higher speed connection, dedicated services, a particular routing or packet configuration, or the like. In any of these or in other examples, the dynamic route information may include a differentiated quality of service (QoS) metric corresponding to the content, the content provider, the communication service provider, the user device, a location of the compute device, or the like.

The technique 1200 may include querying an edge domain name system (DNS) service (which may be located on the compute device or elsewhere) based on a request within the user packet and the dynamic route information. The request may include a uniform resource locator (URL) and the response includes an internet protocol (IP) address pointing to a location of the compute device. The URL may be registered with the edge DNS service via an Edge Application Agent (EAA) service discovery application programming interface (API). In an example, the edge DNS service only accepts a DNS record from local trusted applications via the EAA. In this example, when the URL is not resolvable by the edge DNS service, the DNS service or the compute device may forward the request to a central recursive DNS server of the communication service provider. In another example, when the URL does not resolve in the edge DNS, the compute device may forward the request to an orchestrator of the edge network.

The technique 1200 includes an operation 1210 to outputting data corresponding to the user packet based on the dynamic route information. In an example, the data corresponds to a response from the edge DNS service to the request of the query.

In an example, the network functions hosted for the communication service provider may include 5G network functions, such as user plane functions (UPF). In this example, each of a plurality of communications service providers having a virtual machine at the compute device may have a corresponding UPF hosted at the edge network, such as with N6 and N9 interfaces. A central control plane may be connected to the compute device through a N4 interface (e.g., a single N4 interface for all of the communication service providers or respective N4 interfaces for each of the communication service providers). In an example, a source Network Address Translation (NAT) for each N6 interface is used to differentiate the plurality of communication service providers. This may include at least one user equipment (UE) address that overlaps between at least two of the plurality of communication service providers. Thus, for a UE that address that uses two communication service providers, the compute device may distinguish which communication service provider to use for a particular packet received.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Example 1 is a compute device operable in an edge network for providing neutral host edge services, the compute device comprising: memory including instructions; and processing circuitry to execute the instructions including operations to: generate a plurality of virtual machines for a corresponding plurality of communication service providers at the compute device, including a virtual machine configured to host network functions for a communication service provider of the plurality of communication service providers; receive a user packet originated at a user device associated with the communication service provider; identify dynamic route information related to the user packet using the virtual machine corresponding to the communication service provider; query an edge domain name system (DNS) service on the compute device based on a request within the user packet and the dynamic route information; and output data corresponding to a response to the request from the edge DNS service to the user device.

In Example 2, the subject matter of Example 1 includes, wherein the request includes a uniform resource locator (URL) and the response includes an internet protocol (IP) address pointing to a location of the compute device.

In Example 3, the subject matter of Example 2 includes, wherein the URL is registered with the edge DNS service via an Edge Application Agent (EAA) service discovery application programming interface (API).

In Example 4, the subject matter of Example 3 includes, wherein the edge DNS service only accepts a DNS record from local trusted applications via the EAA.

In Example 5, the subject matter of Examples 1-4 includes, wherein the dynamic route information is based on a user selection of edge services.

In Example 6, the subject matter of Examples 1-5 includes, wherein the dynamic route information includes a differentiated quality of service (QoS) metric corresponding to the communication service provider and the user device.

In Example 7, the subject matter of Examples 1-6 includes, wherein the network functions are 5G network user plane functions (UPF).

In Example 8, the subject matter of Example 7 includes, wherein each of the plurality of communication service providers has a corresponding UPF hosted at the compute device with N6 and N9 interfaces, while connecting to a respective central control plane through a N4 interface.

In Example 9, the subject matter of Example 8 includes, wherein a source Network Address Translation (NAT) for each N6 interface is used to differentiate the plurality of communication service providers including for at least one user equipment (UE) address that overlaps between at least two of the plurality of communication service providers.

In Example 10, the subject matter of Examples 1-9 includes, wherein, in response to receiving a second packet from the user device associated with the communication service provider, the instructions further include operations to identify that a request in the second packet does not resolve in the edge DNS, and forward the request in the second packet to a central recursive DNS server of the communication service provider.

Example 11 is a method for providing neutral host edge services in an edge network, the method comprising: generating, using processing circuitry of a compute device operable in the edge network, a plurality of virtual machines for a corresponding plurality of communication service providers at a compute device, including a virtual machine configured to host network functions for a communication service provider of the plurality of communication service providers; receiving a user packet originated at a user device associated with the communication service provider; identifying dynamic route information related to the user packet using the virtual machine corresponding to the communication service provider; querying an edge domain name system (DNS) service on the compute device based on a request within the user packet and the dynamic route information; and outputting data corresponding to a response to the request from the edge DNS service to the user device.

In Example 12, the subject matter of Example 11 includes, in response to receiving a second packet from the user device associated with the communication service provider, identifying that a request in the second packet does not resolve in the edge DNS, and forwarding the request in the second packet to a central recursive DNS server of the communication service provider.

In Example 13, the subject matter of Examples 11-12 includes, wherein the request includes a uniform resource locator (URL) and the response includes an internet protocol (IP) address pointing to a location of the compute device.

Example 14 is an apparatus for providing neutral host edge services in an edge network, the apparatus comprising: means for generating, using processing circuitry of a compute device operable in the edge network, a plurality of virtual machines for a corresponding plurality of communication service providers at a compute device, including a virtual machine configured to host network functions for a communication service provider of the plurality of communication service providers; means for receiving a user packet originated at a user device associated with the communication service provider; means for identifying dynamic route information related to the user packet using the virtual machine corresponding to the communication service provider; means for querying an edge domain name system (DNS) service on the compute device based on a request within the user packet and the dynamic route information; and means for outputting data corresponding to a response to the request from the edge DNS service to the user device.

In Example 15, the subject matter of Example 14 includes, wherein the dynamic route information is based on a user selection of edge services.

In Example 16, the subject matter of Examples 14-15 includes, wherein the dynamic route information includes a differentiated quality of service (QoS) metric corresponding to the communication service provider and the user device.

Example 17 is at least one non-transitory machine-readable medium including instructions for providing neutral host edge services in an edge network, the instructions, when executed, causing processing circuitry to: generate a plurality of virtual machines for a corresponding plurality of communication service providers at a compute device, including a virtual machine configured to host network functions for a communication service provider of the plurality of communication service providers; receive a user packet originated at a user device associated with the communication service provider; identify dynamic route information related to the user packet using the virtual machine corresponding to the communication service provider; query an edge domain name system (DNS) service on the compute device based on a request within the user packet and the dynamic route information; and output data corresponding to a response to the request from the edge DNS service to the user device.

In Example 18, the subject matter of Example 17 includes, wherein the request includes a uniform resource locator (URL) and the response includes an internet protocol (IP) address pointing to a location of the compute device.

In Example 19, the subject matter of Example 18 includes, wherein the URL is registered with the edge DNS service via an Edge Application Agent (EAA) service discovery application programming interface (API).

In Example 20, the subject matter of Example 19 includes, wherein the edge DNS service only accepts a DNS record from local trusted applications via the EAA.

In Example 21, the subject matter of Examples 17-20 includes, wherein the dynamic route information includes a differentiated quality of service (QoS) metric corresponding to the communication service provider and the user device.

In Example 22, the subject matter of Examples 17-21 includes, wherein the network functions are 5G network user plane functions (UPF).

In Example 23, the subject matter of Example 22 includes, wherein each of the plurality of communication service providers has a corresponding UPF hosted at the compute device with N6 and N9 interfaces, while connecting to a respective central control plane through a N4 interface.

In Example 24, the subject matter of Example 23 includes, wherein a source Network Address Translation (NAT) for each N6 interface is used to differentiate the plurality of communication service providers including for at least one user equipment (UE) address that overlaps between at least two of the plurality of communication service providers.

In Example 25, the subject matter of Examples 17-24 includes, wherein, in response to receiving a second packet from the user device associated with the communication service provider, the instructions further include operations to identify that a request in the second packet does not resolve in the edge DNS, and forward the request in the second packet to a central recursive DNS server of the communication service provider.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25, or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A compute device operable in an edge network for providing neutral host edge services, the compute device comprising:
    memory including instructions; and
    processing circuitry to execute the instructions including operations to:
    generate a plurality of virtual machines for a corresponding plurality of communication service providers at the compute device, including a virtual machine configured to host network functions for a communication service provider of the plurality of communication service providers;
    receive a user packet originated at a user device associated with the communication service provider;
    identify dynamic route information related to the user packet using the virtual machine corresponding to the communication service provider, the dynamic route information identified based on information corresponding to a selected service in the user packet;
    query an edge domain name system (DNS) service on the compute device based on a request within the user packet and the dynamic route information; and
    output data corresponding to a response to the request from the edge DNS service to the user device.

2. The compute device of claim 1, wherein the request includes a uniform resource locator (URL) and the response includes an internet protocol (IP) address pointing to a location of the compute device.

3. The compute device of claim 2, wherein the URL is registered with the edge DNS service via an Edge Application Agent (EAA) service discovery application programming interface (API).

4. The compute device of claim 3, wherein the edge DNS service only accepts a DNS record from local trusted applications via the EAA.

5. The compute device of claim 1, wherein the dynamic route information is based on a user selection of edge services.

6. The compute device of claim 1, wherein the dynamic route information includes a differentiated quality of service (QOS) metric corresponding to the communication service provider and the user device.

7. The compute device of claim 1, wherein the network functions are 5G network user plane functions (UPF).

8. The compute device of claim 7, wherein each of the plurality of communication service providers has a corresponding UPF hosted at the compute device with N6 and N9 interfaces, while connecting to a respective central control plane through a N4 interface.

9. The compute device of claim 8, wherein a source Network Address Translation (NAT) for each N6 interface is used to differentiate the plurality of communication service providers including for at least one user equipment (UE) address that overlaps between at least two of the plurality of communication service providers.

10. The compute device of claim 1, wherein, in response to receiving a second packet from the user device associated with the communication service provider, the instructions further include operations to identify that a request in the second packet does not resolve in the edge DNS service, and forward the request in the second packet to a central recursive DNS server of the communication service provider.

11. A method for providing neutral host edge services in an edge network, the method comprising:
generating, using processing circuitry of a compute device operable in the edge network, a plurality of virtual machines for a corresponding plurality of communication service providers at a compute device, including a virtual machine configured to host network functions for a communication service provider of the plurality of communication service providers;
receiving a user packet originated at a user device associated with the communication service provider;
identifying dynamic route information related to the user packet using the virtual machine corresponding to the communication service provider, the dynamic route information identified based on information corresponding to a selected service in the user packet;
querying an edge domain name system (DNS) service on the compute device based on a request within the user packet and the dynamic route information; and
outputting data corresponding to a response to the request from the edge DNS service to the user device.

12. The method of claim 11, further comprising, in response to receiving a second packet from the user device associated with the communication service provider, identifying that a request in the second packet does not resolve in the edge DNS service, and forwarding the request in the second packet to a central recursive DNS server of the communication service provider.

13. The method of claim 11, wherein the request includes a uniform resource locator (URL) and the response includes an internet protocol (IP) address pointing to a location of the compute device.

14. An apparatus for providing neutral host edge services in an edge network, the apparatus comprising:
means for generating a plurality of virtual machines for a corresponding plurality of communication service providers at a compute device, including a virtual machine configured to host network functions for a communication service provider of the plurality of communication service providers;
means for receiving a user packet originated at a user device associated with the communication service provider;
means for identifying dynamic route information related to the user packet using the virtual machine corresponding to the communication service provider, the dynamic route information identified based on information corresponding to a selected service in the user packet;
means for querying an edge domain name system (DNS) service on the compute device based on a request within the user packet and the dynamic route information; and
means for outputting data corresponding to a response to the request from the edge DNS service to the user device.

15. The apparatus of claim 14, wherein the dynamic route information is based on a user selection of edge services.

16. The apparatus of claim 14, wherein the dynamic route information includes a differentiated quality of service (QOS) metric corresponding to the communication service provider and the user device.

17. At least one non-transitory machine-readable medium including instructions for providing neutral host edge services in an edge network, the instructions, when executed, causing processing circuitry to:
generate a plurality of virtual machines for a corresponding plurality of communication service providers at a compute device, including a virtual machine configured to host network functions for a communication service provider of the plurality of communication service providers;
receive a user packet originated at a user device associated with the communication service provider;
identify dynamic route information related to the user packet using the virtual machine corresponding to the communication service provider, the dynamic route information identified based on information corresponding to a selected service in the user packet;
query an edge domain name system (DNS) service on the compute device based on a request within the user packet and the dynamic route information; and
output data corresponding to a response to the request from the edge DNS service to the user device.

18. The at least one non-transitory machine-readable medium of claim 17, wherein the request includes a uniform resource locator (URL) and the response includes an internet protocol (IP) address pointing to a location of the compute device.

19. The at least one non-transitory machine-readable medium of claim 18, wherein the URL is registered with the edge DNS service via an Edge Application Agent (EAA) service discovery application programming interface (API).

20. The at least one non-transitory machine-readable medium of claim 19, wherein the edge DNS service only accepts a DNS record from local trusted applications via the EAA.

21. The at least one non-transitory machine-readable medium of claim 17, wherein the dynamic route information includes a differentiated quality of service (QOS) metric corresponding to the communication service provider and the user device.

22. The at least one non-transitory machine-readable medium of claim 17, wherein the network functions are 5G network user plane functions (UPF).

23. The at least one non-transitory machine-readable medium of claim 22, wherein each of the plurality of communication service providers has a corresponding UPF hosted at the compute device with N6 and N9 interfaces, while connecting to a respective central control plane through a N4 interface.

24. The at least one non-transitory machine-readable medium of claim 23, wherein a source Network Address Translation (NAT) for each N6 interface is used to differentiate the plurality of communication service providers including for at least one user equipment (UE) address that overlaps between at least two of the plurality of communication service providers.

25. The at least one non-transitory machine-readable medium of claim 17, wherein, in response to receiving a second packet from the user device associated with the communication service provider, the instructions further include operations to identify that a request in the second packet does not resolve in the edge DNS service, and forward the request in the second packet to a central recursive DNS server of the communication service provider.

* * * * *